3,136,782
HALO-THIANAPHTHENE-1,1-DIOXIDES
Russell M. Bimber, Painesville, and Henry Bluestone, University Heights, Ohio, assignors to Diamond Alkali Company, Cleveland, Ohio, a corporation of Delaware
No Drawing. Filed Feb. 11, 1960, Ser. No. 7,983
4 Claims. (Cl. 260—330.5)

This invention relates to a novel class of biologically active compounds and to methods of preparing and using these compounds.

More specifically, the compounds of the present invention are pesticides having the following generic formula:

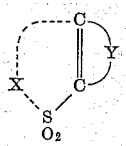

wherein X is a bivalent radical selected from the group consisting of

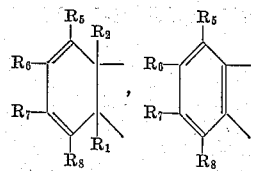 , 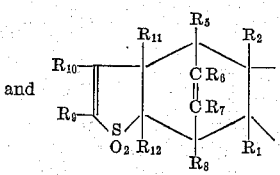

and

Y is selected from the group consisting of the bivalent radical

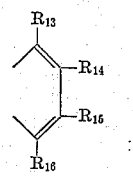

and a combination of two different monovalent radicals, $R_3$ and $R_4$, and $R_1$ through $R_{16}$ are selected from the group consisting of hydrogen atoms, methyl radicals, phenyl radicals, and halogen atoms, at least two of said R's being halogen.

Exemplary of specific compounds falling within the above generic formula are the following:

(I) 3,5,6-trichlorothianaphthene 1,1-dioxide

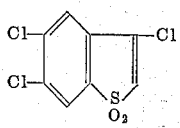

(II) 2,3,7,8-tetrachlorodibenzothiophene 5,5-dioxide

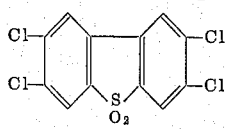

(III) 3,5 - dichloro - 3a,7a - dihydrothianaphthene 1,1-dioxide

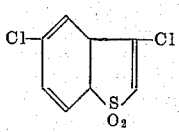

(IV) 3,6-dichloro-3a,7a-dihydrothianaphthene 1,1- dioxide.

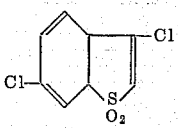

(V) 2,3,8 - trichloro - 5a,9a - dihydrodibenzothiophene 5,5-dioxide.

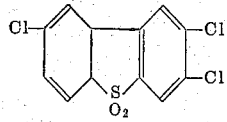

(VI) 2,3,7-trichloro - 5a,9a - dihydrodibenzothiophene 5,5-dioxide.

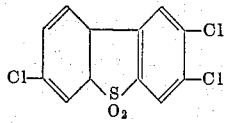

(VII) 3,7,9 - trichloro-4,8-etheno-3a,4,4a,7a,8,8a-hexahydrobenzo[1.2-b, 4.5-b']dithiophene 1,1,5,5-tetroxide.

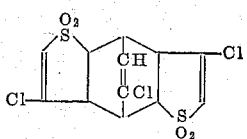

(VIII) 3,5,9-trichloro-4,8-etheno-3a,4,4a,7a,8,8a-hexahydrobenzo[1.2-b, 5.4-b']dithiophene 1,1,7,7-tetroxide.

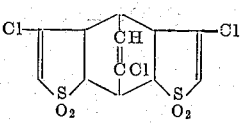

IX 3,5,10-trichloro - 4,8 - etheno-3a,4,4a,7a,8,8a-hexahydrobenzo (1.2-b, 5.4-b') dithiophene 1,1,7,7-tetroxide.

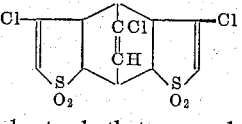

It is to be understood, that as used hereinafter, the term "pesticide" or "pesticidal composition" is meant to refer to those toxic compositions which are effective in killing or controlling the growth of plants, insects, nematodes, microorganisms, fungi, bacteria, and the like, and it is intended to refer broadly to those compositions commonly known as insecticides, bactericides, fungicides, nematocides, herbicides, and the like.

Additionally, the term "halogen," as used hereinafter, is intended to refer broadly to fluorine, chlorine, bromine and iodine. However, because of its low cost and ready availability, the preferred halogen in the compositions of the present invention is chlorine and for this reason, primary reference hereinafter will be made thereto.

While compounds of this invention may be employed in a variety of applications, biologically active or otherwise, it will be understood, of course, that such compounds may be utilized in diverse formulations, both liquid and solid, including finely-divided powders and granular materials, as well as liquids, such as solutions, concentrates, emulsifiable concentrates, slurries and the like, depending upon the application intended and the formulation media desired.

These compounds may be used alone or in combination with other known biologically active materials so as to provide a formulation which may be effective in controlling a variety of pests.

Thus, it will be appreciated that compounds of this invention may be employed as essential active ingredients of biologically active compositions which may also include finely-divided dry or liquid diluents, extenders, fillers, conditioners, including various clays, diatomaceous earth, talc, spent catalyst, alumina-silica materials, liquids, solvents, including water and various organic liquids, such as benzene, toluene, chlorinated benzene, acetone, cyclohexanone, xylene, carbon disulfide, and various mixtures thereof.

When liquid formulations are employed or dry materials prepared which are to be used in liquid form, it may be desirable, additionally, to employ a wetting, emulsifying or dispersing agent to facilitate the use of the formulation, e.g., Triton X–155 (alkyl aryl polyether alcohol, U.S. Patent No. 2,504,064).

Additionally, it is to be understood that the term "carrier" as employed in the specification and claims hereof is intended to refer broadly to materials constituting a major proportion of a biologically active or other formulation and, hence, includes finely-divided materials, both liquid and solid, as aforementioned, conveniently used in such applications.

In general, compounds of the present invention can be prepared by effecting a Diels-Alder type reaction of a halogenated thiophene 1,1-dioxide with itself or with another thiophene, 1,1-dioxide. The resulting product is then obtained as one of the compounds of the present invention or it may be further reacted with a thiophene 1,1-dioxide in a second Diels-Alder reaction to produce other compounds falling within the generic structure of the present invention.

More specifically, a compound having the generic formula

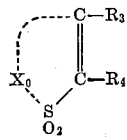

wherein $X_0$ is a bivalent radical selected from the group consisting of

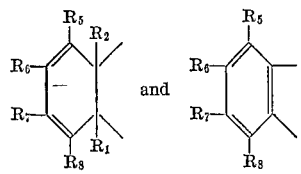

and $R_1$ through $R_8$ are selected from the group consisting of hydrogen atoms, methyl radicals, phenyl radicals and halogen atoms, at least two of the R's being halogen, may be formed by causing a halogenated thiophene 1,1-dioxide having the formula

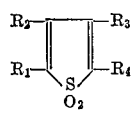

to undergo a Diels-Alder reaction with a thiophene 1,1-dioxide having the formula

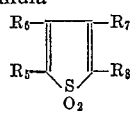

$R_1$ through $R_8$ being as previously defined. The resulting product is then collected as one of the compounds of the present invention or it may be reacted in a second Diels-Alder reaction with additional quantities of a thiophene 1,1-dioxide so as to produce other compounds falling within the scope of the invention. These Diels-Alder reactions may be carried out by refluxing the less reactive thiophene 1,1-dioxides, such as 3,4-dichlorothiophene 1,1-dioxide and 3,4-diphenylthiophene 1,1-dioxide, in a suitable solvent, such as trichlorobenzene, xylene, or benzene. The more reactive thiophene 1,1-dioxide intermediates are not isolated, but are generated, via dehydrohalogenation in the reaction mixture. The resulting products may then be collected and purified by recrystallization from a solvent, such as methanol or chloroform.

In order that those skilled in the art may better understand the method of the present invention and the manner in which it may be practiced, the following specific examples are given. In these examples, the 3,4-dichlorothiophene 1,1-dioxide is prepared according to the procedure set forth in the U.S. patent application Serial No. 709,449, now U.S. Patent No. 2,976,297. Moreover, the 3,3,4,4-tetrachlorotetrahydrothiophene-1,1-dioxide referred to in this preparation is prepared according to the method set forth in U.S. patent application Serial No. 645,676, now U.S. Patent No. 2,957,887. The 3,3,4-trichlorotetrahydrothiophene-1,1-dioxide is prepared according to the following procedure: 400.0 g. (2.12 moles) of 3,4-dichlorotetrahydrothiophene-1,1-dioxide are dissolved in three liters of carbon tetrachloride at reflux temperature. The reaction mixture is illuminated by a 100 watt Hanovia #8A1 ultraviolet lamp in a quartz immersion well while 325.0 g. (4.6 moles) of chlorine are passed into the mixture over a period of 4.5 hours. Air is blown through the hot product suspension to remove hydrochloric acid and excess chlorine. The mixture is then cooled, filtered and the resulting solid washed with cold carbon tetrachloride. Recrystallizations from carbon tetrachloride and methanol gave pure 3,3,4-trichlorotetrahydrothiophene-1,1-dioxide, having a melting point of 110–111° C.

EXAMPLE 1

*Preparation of 3,5,6-Trichlorothianaphthene-1,1-Dioxide* (I)

A solution of 25.8 g. (0.1 mole) of 3,3,4,4-tetrachlorotetrahydrothiophene-1,1-dioxide in 150 ml. of xylene is stirred and cooled below 30° C. for two hours while 7 g. (0.4 mole, 100% excess) of anhydrous ammonia is added to convert the tetrachloro compound to 3,4-dichlorothiophene-1,1-dioxide. The resulting mixture is stirred at reflux temperature for one hour, and filtered hot. The filtrate is chilled overnight at minus 20° C., then filtered. Concentrating and cooling the filtrate produces 6.6 g. (49%) of crude (I), M.P. 167–171° C. Two recrystallizations from methanol, including a decolorizing treatment, produces pure (I), M.P. 170–171° C., which has the following analysis:

| Element | Calculated, percent by Weight | Actual, percent by Weight |
|---|---|---|
| C | 35.7 | 35.7 |
| H | 1.12 | 1.4 |
| Cl | 39.6 | 39.6 |

EXAMPLE 2

*Preparation of 2,3,7,8-Tetrachlorodibenzothiophene-5,5-Dioxide,* (II)

A solution of 22.6 g. (0.084 mole) of 3,5,6-trichlorothianaphthene 1,1-dioxide in 400 ml. of 1,2,4-trichlorobenzene is stirred at reflux (200–215° C.) for two hours while a solution of 32.2 g. (0.174 mole) of 3,4-dichlorothiophene 1,1-dioxide in 250 ml. of chloroform is added dropwise. Chloroform is allowed to distill out during the addition. Refluxing is continued for an hour, then the solvent is distilled off under vacuum until about 150 ml. of material remains and solid begins to form. Adding 150 ml. petroleum ether, cooling, and filtering produces 19.6 g. (48%) crude brown (II). This is recrystallized twice from benzene and twice from chloroform, yielding 9.4 g. (23%) fine white needle-shaped crystals of (II), M.P. 380–381° C., having the following analysis.

| Element | Calculated, percent by Weight | Actual, percent by Weight |
|---|---|---|
| C | 40.7 | 39.9 |
| H | 1.14 | 1.3 |
| Cl | 40.0 | 39.7 |
| S | 9.1 | 9.1 |

EXAMPLE 3

*Preparation of 3,(5 and/or 6)-Dichloro-3a,7a-Dihydro-thianaphthene 1,1-Dioxide, (III) and/or (IV)*

A solution of 112 g. (0.5 mole) 3,3,4-trichlorotetrahydrothiophene 1,1-dioxide in 1400 ml. of methanol is stirred at room temperature while 67.5 ml. (1.0 mole) 58% ammonium hydroxide is added over a period of twenty-five minutes. The solution is believed to contain 3-chlorothiophene 1,1-dioxide at this point. The excess ammonia is neutralized by adding 15 ml. (0.18 mole) of 37% hydrochloric acid ten minutes after the addition of ammonia is completed. A mixture of 700 ml. of water and 700 g. of ice is added, with stirring. When the ice has just melted, filtration removes 42 g. of 3,4-dichloro-2,3-dihydrothiophene 1,1-dioxide. An additional 8.9 g. of solid separates from the filtrate upon partial evaporation in a stream of air at room temperature. The latter solid is recrystallized from methanol and 7.1 g. (12%) pure (III) and/or (IV), M.P. 157.5 to 158.5° C. results. Its analysis follows:

| Element | Calculated, percent by Weight | Actual, percent by Weight |
|---|---|---|
| C | 40.5 | 40.8 |
| H | 2.5 | 2.4 |
| Cl | 29.9 | 29.7 |

EXAMPLE 4

*Preparation of 3,7,9-Trichloro-4,8-Etheno-3a,4,4a,7a,8,8a-Hexahydrobenzo[1.2 - b, 4.5 - b']Dithiophene 1,1,5,5-Tetroxide (VII) and/or 3,5,9-Trichloro-4,8-Etheno-3a, 4,4a,7a,8,8a-Hexahydrobenzo[1.2-b, 5.4-b']Dithiophene 1,1,7,7-Tetroxide (VIII) and/or 3,5,10-Trichloro-4,8-Etheno-3a,4,4a,7a,8,8a-Hexahydrobenzo[1.2-b, 5.4-b'] Dithiophene 1,1,7,7-Tetroxide (IX)*

A solution of 224 g. (1.0 mole) of 3,3,4-trichlorotetrahydrothiophene 1,1-dioxide in 2800 ml. of methanol is stirred below 30° C. while 135 ml. (2.0 moles) of 58% ammonium hydroxide is added over a thirty-five minute period. The solution is believed to contain 3-chlorothiophene 1,1-dioxide at this point. The excess ammonia is neutralized with 20 ml. (0.24 mole) of 37% hydrochloric acid. The mixture is stirred during the addition of 2800 g. of crushed ice and thereafter until the ice is melted. The solid which separates is removed by filtration. The filtrate is distilled at atmospheric pressure until the vapor temperature reaches 90° C., and then the residual water solution is cooled, producing a solid. The latter solid is extracted with three 5 ml. portions of chloroform at room temperature, leaving 7.9 g. of crude product. This is recrystallized from chloroform in a Soxhlet extraction apparatus, producing 6.2 g. (5%) of (VII) and/or (VIII) and/or (IX), M.P. (dec.) 330–332° C. The analysis of this material is as follows:

| Element | Calculated, percent by Weight | Actual, percent by Weight |
|---|---|---|
| C | 37.2 | 37.2 |
| H | 2.34 | 2.2 |
| Cl | 27.46 | 27.3 and 27.6 |

EXAMPLE 5

A tomato foliage disease test is conducted measuring the ability of the product of Example 1 to protect tomato foliage against infection by the early blight fungus, *Alternaria solani*. Tomato plants 5 to 7 inches high of the variety Bonny Best are employed. 100 ml. of the test formulations (varying amounts of the product of Example 1—5% acetone-0.01% Triton X–155-balance water) are sprayed on the plants at 40 lbs. air pressure while the plants are being rotated on a turntable in a spray chamber. After the spray deposits are dry, the treated plants and comparable untreated controls are again sprayed as described above with a sporangial suspension containing approximately 20,000 conidia of *A. solani* per ml. for 30 seconds at 20 lbs. air pressure. The plants are held in a 100% humid atmosphere for 24 hours at 70° F. to permit spore germination and infection. One day after removal from the humid atmosphere, lesion counts are made on the three uppermost fully expanded leaves. Using this procedure, the concentrations of the product of Example 1 used and the results obtained are as follows:

| Concentration in p.p.m.: | Percent disease control |
|---|---|
| 512 | 100 |
| 256 | 100 |
| 128 | 99 |
| 64 | 99 |
| 32 | 78 |

EXAMPLE 6

Fungicidal utility is further demonstrated by the ability of the product of Example 1 to protect tomato plants against the late blight fungus, *Phytophthora infestans*. The method employs tomato plants 5 to 7 inches high of the variety Bonny Best. 100 ml. of the test formulations (varying amounts of the product of Example 1—5% acetone-0.01% Triton X–155-balance water) are sprayed on the plants at 40 lbs. air pressure while the plants are being rotated on a turntable in a spray chamber. After the spray deposits are dry, the treated plants and comparable untreated controls are again sprayed as described above with a sporangial suspension containing approximately 150,000 sporangia of *P. infestans* per ml. for 30 seconds at 20 lbs. air pressure. The plants are held in a 100% humid atmosphere for 24 hours at 60° F. to permit spore germination and infection. After 2 to 4 days, lesion counts are made on the three uppermost fully expanded leaves. Using this procedure, the concentrations of the product of Example 1 used and the results obtained are as follows:

| Concentration in p.p.m.: | Percent disease control |
|---|---|
| 512 | 100 |
| 256 | 100 |
| 128 | 100 |
| 64 | 96 |

EXAMPLE 7

In this test, the ability of the product of Example 1 to control anthracnose of cucumber incited by the fungus *Colletotrichum lagenarium*, is determined. In this test, cucumber plants, variety National Pickling, having one fully expanded leaf are sprayed with varying concentrations of the product of Example 1, in the same manner as in Examples 5 and 6. Thereafter, the plants are innoculated by spraying with a spore suspension containing 400,000 per ml. for 30 seconds at 20 lbs./sq. in. and then incubated in a moist chamber at 70° F. for 24 hours. After 4 to 6 days, necrotic lesions are counted on the treated plants and the untreated controls and the percent disease control afforded by the product of Example 1 is calculated. Using this procedure, the concentrations of the product of Example 1 used and the results obtained are as follows:

| Concentration in p.p.m.: | Percent disease control |
|---|---|
| 256 | 100 |
| 128 | 100 |
| 64 | 100 |
| 32 | 100 |

EXAMPLE 8

In this test, the ability of the product of Example 1 to inhibit mycelian growth, of *Rhizoctonia solani* in soil is determined. Sterile soil is infested with *Rhizoctonia solani* grown on a corn meal-sand medium. The infested soil is then placed in 4 oz. squat Dixie cups and the surface of the soil in the cups is drenched with varying amounts of a formulation containing 2012 p.p.m. of the product of Example 1, 4% acetone and 0.01% Triton X-155. The surface area of the soil in the cups is 5.73 square inches so that a concentration rate of 1 lb./acre requires 0.414 mg. of the chemical under test per cup. After drenching, the cups are placed in a water-saturated atmosphere at 70° F. for 48 hours. At the end of this time, the fungus mycelium has completely overgrown the surface of the soil in the control cups. Inhibition of mycelial growth is graded on a scale from 0 for complete inhibition of growth to 10 which is equivalent to the growth in the untreated controls. These grades are then expressed as percent control. Using this procedure, the concentrations of the product of Example 1 used and the results obtained are as follows:

| Concentration in p.p.m.: | Percent disease control |
|---|---|
| 256 | 100 |
| 128 | 90 |
| 64 | 90 |
| 32 | 90 |
| 16 | 80 |
| 8 | 80 |
| 4 | 90 |

EXAMPLE 9

In this test, soil infested with *Plasmodiophora brassieae*, the club root organism, is placed in one-half gallon glazed crocks and the product of Example 1 is intimately mixed with the soil in these crocks at dosages equivalent to 64, 32 and 16 lbs. active chemical per acre, calculated on the basis of the soil area in each pot. Ten days after treating the soil in the crocks, three 40-day old cabbage plants, variety Golden Acre, are transplanted into each of the treated crocks as well as into nontreated infested check crocks and noninfested check crocks. Fifty days after transplanting, the roots of the plants are washed free of soil and the root systems are classified according to the following scheme: 0=no clubs, 1=small clubs on a few lateral roots, 2=large clubs on the lateral roots or small clubs on the tap roots, and 3=large clubs on the tap roots with poor lateral root development. Thereafter, a club root index is calculated from the following formula:

Club root index
$$= \frac{\text{sum of the products of (the number of plants in each class times the respective value)} \times 100}{3 \times \text{the total number of plants}}$$

The index thus calculated ranges from 0, indicating all plants are free from club root, to 100, indicating that all plants are severely diseased.

Using this procedure, a club root index of 0 is obtained for the noninfested check and a club root index of 69 is obtained for the nontreated infested check, while the product of Example 1 gives club root indexes of 0, 27 and 28 at concentrations of 64, 32 and 16 lbs./acre, respectively.

EXAMPLE 10

The following test measures the ability of the product of Example 1 to protect pea seed and seedlings from seed decay and damping off fungi (Pythium and Fusarium). In this test infested soil in 4 x 4 x 3 inch plant band boxes is treated by a soil drench-mix method at the equivalent rates of 8 and 4 lbs./acre. Treatment is accomplished by pouring 4.4 ml. and 2.2 ml. of a 2000 p.p.m. test formulation (2000 p.p.m. product of Example 1—5% acetone-0.01% Triton X-155) on the surface of the soil. This is allowed to stand until the next day when the soil is removed from each box and thoroughly mixed before being replaced in the box. Three days after treatment, 25 pea seeds, variety Perfection, are planted at a uniform depth in each box. Untreated checks are included in each test in addition to a check planted in sterilized soil. Readings 14 days after planting shows 98 and 92% stand, for concentrations of 4 and 8 lbs./acre respectively of the product of Example 1 as compared to the sterile checks, wherein the stand is 100%.

EXAMPLE 11

A test is carried out measuring the ability of the product of Example 1 to protect fabrics against cellulose-destroying fungi. Quadruplicate strips (1½" x 6"), of 8 oz. cotton duck, with the long dimension parallel to the warp, are treated by dipping them into solutions of the product of Example 1 dissolved in acetone. They are allowed to dry and then planted vertically in wooden boxes containing soil infested with fungi which destroy untreated strips in about 2 weeks when held at 80° F. At the end of the exposure period, the test specimens are removed from the soil bed and, if not completely degraded, gently washed to remove soil, air dried, and breaking strength determined. Using this procedure, the results show that the cotton duck treated with the product of Example 1 at a concentration of 0.5% has a tensile strength of 52 lbs. after 14 days as compared to the untreated check which has a tensile strength of 0.

EXAMPLE 12

To evaluate bactericidal activity, the product of Example 2 at a concentration of 250 p.p.m. is mixed with distilled water containing 5% acetone and 0.01% Triton X-155. Two ml. of the test formulation is put in a test tube to which is added 0.5 ml. of a culture of broth of the test organism, *Staphylococcus aureus*. The tube is then incubated for 24 hours at 37° C. A sterile broth is innoculated with this mixture using a standard 4 mm. loop. After being incubated for 48 hours at 37° C. the growth of the organism is observed. Using this procedure, the product of Example 2 shows significant inhibition of the growth of the test organism.

EXAMPLE 13

To evaluate the effect of the product of Example 2 upon the germination of seeds in soil, a mixture of seed of six crop plants is broadcast in 8 x 8 x 2 inch metal cake pans filled to within one-half inch of the top with composted greenhouse soil. The seed is uniformly covered with about one-quarter inch of soil and watered. After 24 hours, 80 ml. of an aqueous test formulation (160 mg. product of Example 2—5% acetone-0.01% Triton X-155-balance water) is sprayed, at 10 lbs. air pressure, uniformly over the surface of the pan. This is equivalent to 32 lbs./acre. The seed mixture contains seeds of three representative broadleaved plants; turnip, flax and alfalfa, and three grasses: wheat, millet and rye grass. Two weeks after treatment records are taken on seedling stand as compared to the controls. Using this procedure, results show that the product of Example 2 significantly inhibits the growth of both broadleaved plants and grasses.

EXAMPLE 14

The procedure of Example 11 is repeated using the product of Example 2. The soil is drenched by adding 70 ml. of the test formulation, which is equivalent to a rate of 128 lbs./acre. Using this procedure, the results show that the test boxes treated with the product of Example 2 have a significantly higher percent stand than the untreated checks.

While there have been described various embodiments of the invention, the methods and products described are not intended to be understood as limiting the scope of the invention, as it is realized that changes therewithin are possible, and it is further intended that each element recited in any of the following claims is to be understood as referring to all equivalent elements for accomplishing substantially the same results in substantially the same or equivalent manner, it being intended to cover the invention in whatever form its principle may be utilized.

What is claimed is:

1. A compound of the structure

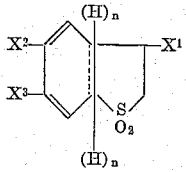

wherein $X^1$ is halogen, $X^2$ and $X^3$ are each selected from the group consisting of hydrogen and halogen, with at least one of $X^2$ and $X^3$ being halogen; $n$ is a number from 0 to 1 with the proviso that when $n$ is 0 the unsatisfied valance bonds form a second bond between carbon atoms and the 3a- and 7a-positions.

2. 3,5,6-trichlorothianaphthene-1,1-dioxide.

3. 3,5-dichloro - 3a,7a - dihydrothianaphthene-1,1-dioxide.

4. 3,6-dichloro - 3a,7a - dihydrothianaphthene-1,1-dioxide.

References Cited in the file of this patent

UNITED STATES PATENTS

| | | |
|---|---|---|
| 2,539,588 | Moy | Jan. 30, 1951 |
| 2,634,200 | Schlesinger | Apr. 7, 1953 |
| 2,634,201 | Mowry et al. | Apr. 7, 1953 |
| 2,664,426 | Elmer | Dec. 29, 1953 |
| 2,682,545 | Mahan et al. | June 29, 1954 |
| 2,740,744 | Abramitis et al. | Apr. 3, 1956 |
| 2,758,955 | Johnson et al. | Aug. 14, 1956 |
| 2,781,289 | Elmer et al. | Feb. 12, 1957 |
| 2,786,851 | Mahan | Mar. 26, 1957 |
| 2,882,278 | McConnell et al. | Apr. 14, 1959 |
| 2,894,873 | Seven | July 14, 1959 |
| 2,930,800 | Kloetzel et al. | Mar. 29, 1960 |
| 2,949,471 | Prey | Aug. 16, 1960 |

OTHER REFERENCES

Bailey et al.: Jour. Amer. Chem. Soc., vol. 76, pp. 1940–42 (1954).

Hartough: Condensed Thiophenes, 1954, pages 164–165.